United States Patent [19]

Chambers

[11] Patent Number: 4,866,679

[45] Date of Patent: Sep. 12, 1989

[54] METHOD FOR IDENTIFYING ANOMALOUS NOISE AMPLITUDES IN SEISMIC DATA

[75] Inventor: Ronald E. Chambers, Houston, Tex.

[73] Assignee: Western Atlas International, Inc., Houston, Tex.

[21] Appl. No.: 230,909

[22] Filed: Aug. 11, 1988

[51] Int. Cl.$^4$ ............................................... G01V 1/36
[52] U.S. Cl. ......................................... 367/47; 367/38
[58] Field of Search ....................... 367/28, 30, 47, 38; 364/421

[56] References Cited

U.S. PATENT DOCUMENTS

| | | | |
|---|---|---|---|
| 4,218,766 | 8/1980 | Parrack et al. | 367/47 |
| 4,577,298 | 3/1986 | Hinkley | 367/050 |
| 4,613,960 | 9/1986 | Hinkley | 367/051 |
| 4,695,984 | 9/1987 | Paal | 367/054 |

OTHER PUBLICATIONS

Bunch, A., 1979, Method of Computing Surface Consistent Reflection Statics in Miser Using Refracted Arrival Times: Western Geophysical Internal Document 7 pages.
Gutenberg, B., 1936, The Amplitudes of Waves to be Expected in Seismic Prospecting: Geophysics, V. 1 pp. 252–256.
Hermont, A. J., 1969, Is Seismic Energy of Diagnostic Value?: Geophysics, vol. 34, No. 2, pp. 196–212.
Knopoff, L. and Gangi, A. F., 1959, Seismic Reciprocity: Geophysics, vol. 24, No. 4, pp. 681–691.
Larner, K. L. Mateker, E. J. Jr. and Wu, C., 1973, Amplitude: Its Information Content: Geophysical Society of Houston Continuing Education Seminar, 31 pages.
Mateker, E. J. Jr. and Wu, C., 1975, Lithology Determination from Reflection Amplitude: Geophysical Society of Houston Continuing Education Seminar, 11 pages.
Mossman, R. W. and Schoellhorn, S. W., 1975, Reflection Amplitude Variances: Geophysical Society of Houston Continuing Education Seminar, 27 pages.
Sheriff, R. E., 1973, Factors Affecting Amplitudes-A Review of Physical Principles: Geophysical Society of Houston Continuing Education Seminar, 14 pages.
Taner, M. T., and F. Koehler, 1981, Surface Consistent Corrections: Geophysics, vol. 46, No. 1, pp. 17–22.

Primary Examiner—Thomas H. Tarcza
Assistant Examiner—Ian J. Lobo
Attorney, Agent, or Firm—Barry C. Kane

[57] ABSTRACT

A method for identifying anomalous noise amplitudes in seismic records by deriving a measured amplitude factor over predetermined periods of time or time windows for a predetermined number of traces comprising the records is disclosed. A noise-free amplitude factor for the same periods of time and number of traces is also computed using a Gauss-Siedel method of matrix inversion. A ratio of the measured and noise-free amplitude factors is made to determine a correction factor which is compared to a user defined threshold value for determining a presence of anomalous noise amplitudes in the seismic records. Based on the comparison of the correction factor to the threshold value, the user determines whether to suppress or correct traces experiencing the anomalous noise amplitudes.

15 Claims, 4 Drawing Sheets

METHOD FOR IDENTIFYING ANOMALOUS NOISE AMPLITUDES IN SEISMIC DATA

BACKGROUND OF THE INVENTION

1. Field of the Invention

This method relates generally to seismic data processing, and more particularly to a method for evaluating and suppressing anomalous noise amplitudes in seismic data.

2. Discussion of the Related Art

Amplitudes of seismic records have been thoroughly investigated over the last several decades. Gutenberg (1936), referring to earlier works of Knott (1899) and Zoepprits et al. (1912), discussed the expected amplitudes of seismic reflections from the subsurface. After the introduction of automatic gain control (AGC) instrumentation and recording devices, geophysical interpretation was directed more toward the study of time anomalies and reflection character. The study of reflection amplitudes did not become popular again until the development of binary gain and floating point recording. These developments led to the "bright spot" interpretation technique, which incorporated the study of amplitude anomalies into seismic interpretation. The acceptance of the "bright spot" technique was industry wide.

The first application of the technique was to offshore seismic data, principally in deltaic regions. It quickly became evident that the brightness or dullness of the reflection was of significance when making interpretation. Hermont (1969), O'Doherty and Anstey (1971), and Larner et al. (1973) demonstrated the significance and diagnostic value of reflection amplitudes.

Application of these techniques to land situations required a more intensive study of the factors which affect recorded amplitudes. Sheriff (1973), Taner and Koehler (1974) provided an review of these factors, while Houba et al. (1973) and Disher and Randle (1973) discussed a processing method for land data. It is generally recognized that several factors play a role in the amplitude of the received seismic signal. Larner et al. (1973), Larner (1975), and Taner and Koehler (1981) as well as others determined several surface and subsurface characteristics which affect the amplitude of the received seismic signals. The assignee of this invention, as early as October 1977, developed a computation for correcting or removing anomalous noise amplitudes from seismic data. Taner and Koehler (1981) show an example of a similar computation which attempts to recognize anomalous amplitudes caused by outside disturbances such as near-subsurface layers (weathered zone) which might distort or influence the behavior of the received seismic signals.

Of all of the above individuals who studied anomalous amplitude problems in seismic data processing, not one considered noise in any of the calculations/corrections.

SUMMARY OF THE INVENTION

It is an object of this invention to provide a new method for exercising quality control and suppressing anomalous noise amplitude information in seismic data prior to conventional data processing.

It is another object of this invention to provide the above mentioned method where noise in the seismic data is a prime consideration in correcting or suppressing a particular seismic trace (or a portion of the trace) because of amplitude associated problems.

This computer-aided method is designed for evaluating, correcting or suppressing anomalous amplitude values present in seismic data records prior to conventional data processing. This method provides the geophysicist an opportunity to evaluate the amount of noise present in a given trace before final processing where it is difficult to determine and remove the effects of noise on a final section.

Generally amplitude factors are calculated for each trace of demultiplexed seismic data for each shot point as a function of time. The time function is a series of time windows, the period of which is fixed for the calculation and user defined. A mathematical model relating several variable parameters which contribute to amplitude variation are calculated for each trace to produce a measured amplitude factor. Taking the logarithm of both sides of the mathematical model provides a solution to the equations which yield a computed noise-free amplitude factor. A correction ratio of the computed noise-free amplitude factor to the measured amplitude factor is made which is then weighed against user defined values chosen from predetermined histograms and printouts. If the correction ratio exceeds a given threshold, the entire trace, or only the portion of the trace exhibiting the anomalous amplitude may be corrected or removed prior to conventional data processing techniques.

BRIEF DESCRIPTION OF THE DRAWING FIGURES

A better understanding of the benefits and advantages of my invention may be obtained from the appended detailed description and the drawing, wherein.

Figure 2:
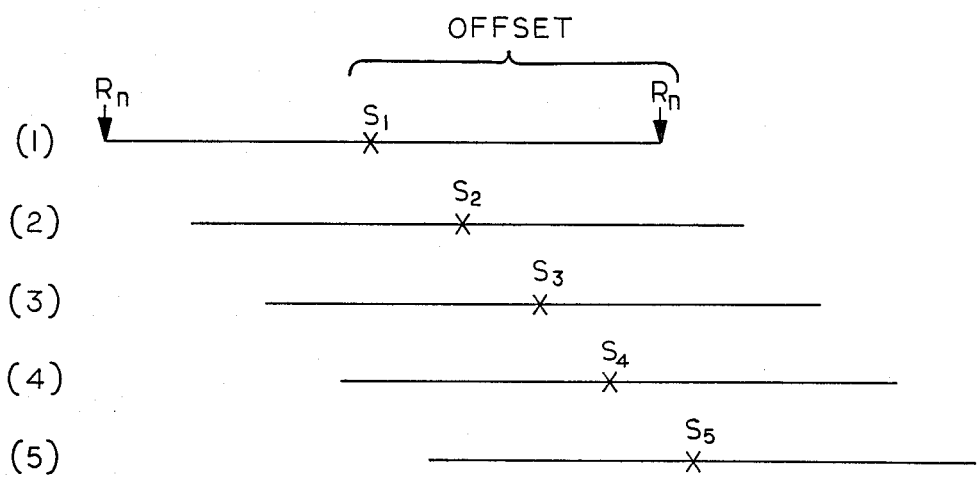
FIG. 2 is a general illustration of one source-receiver geometry used in a typical seismic survey line.
Figure 3:
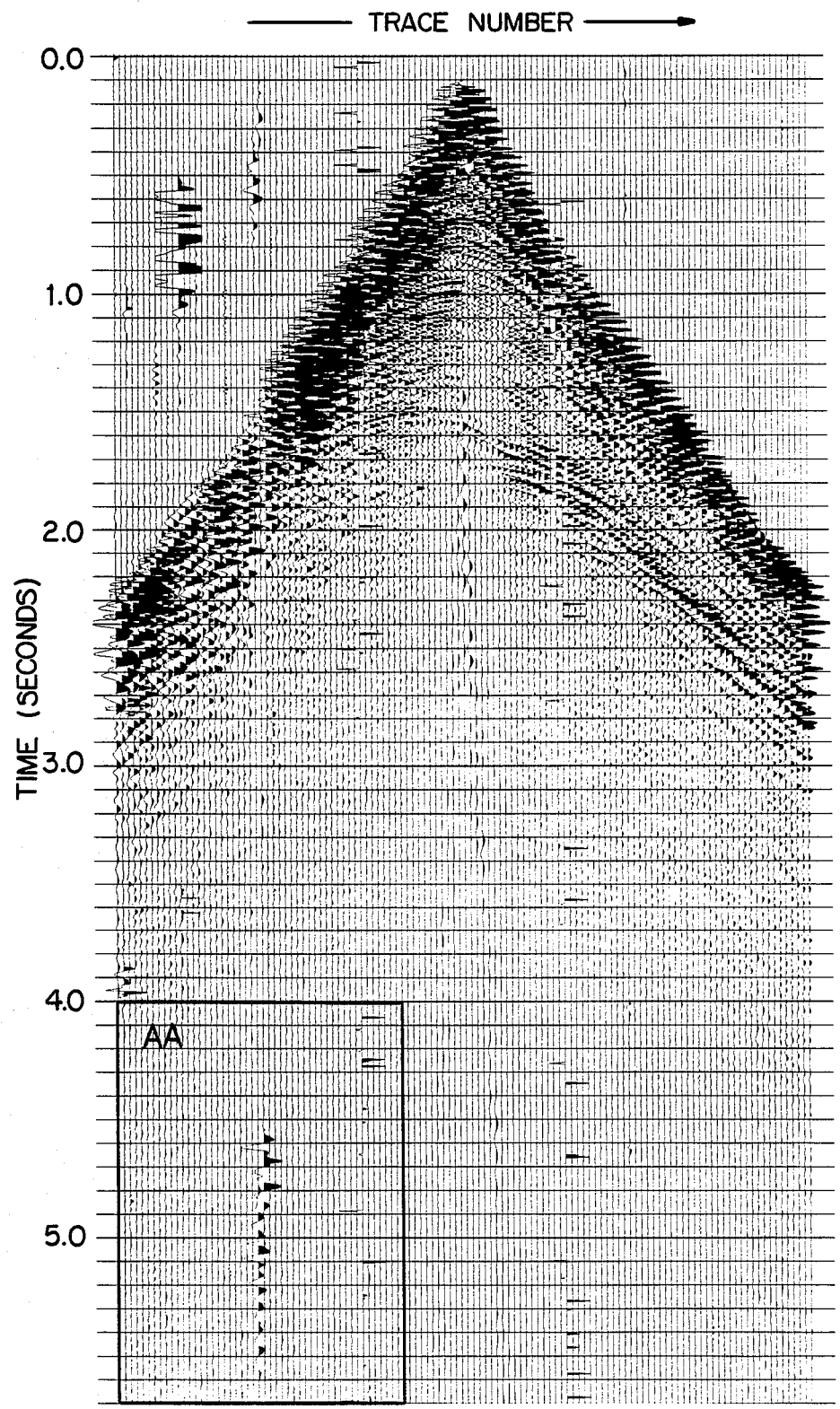
Figure 4:
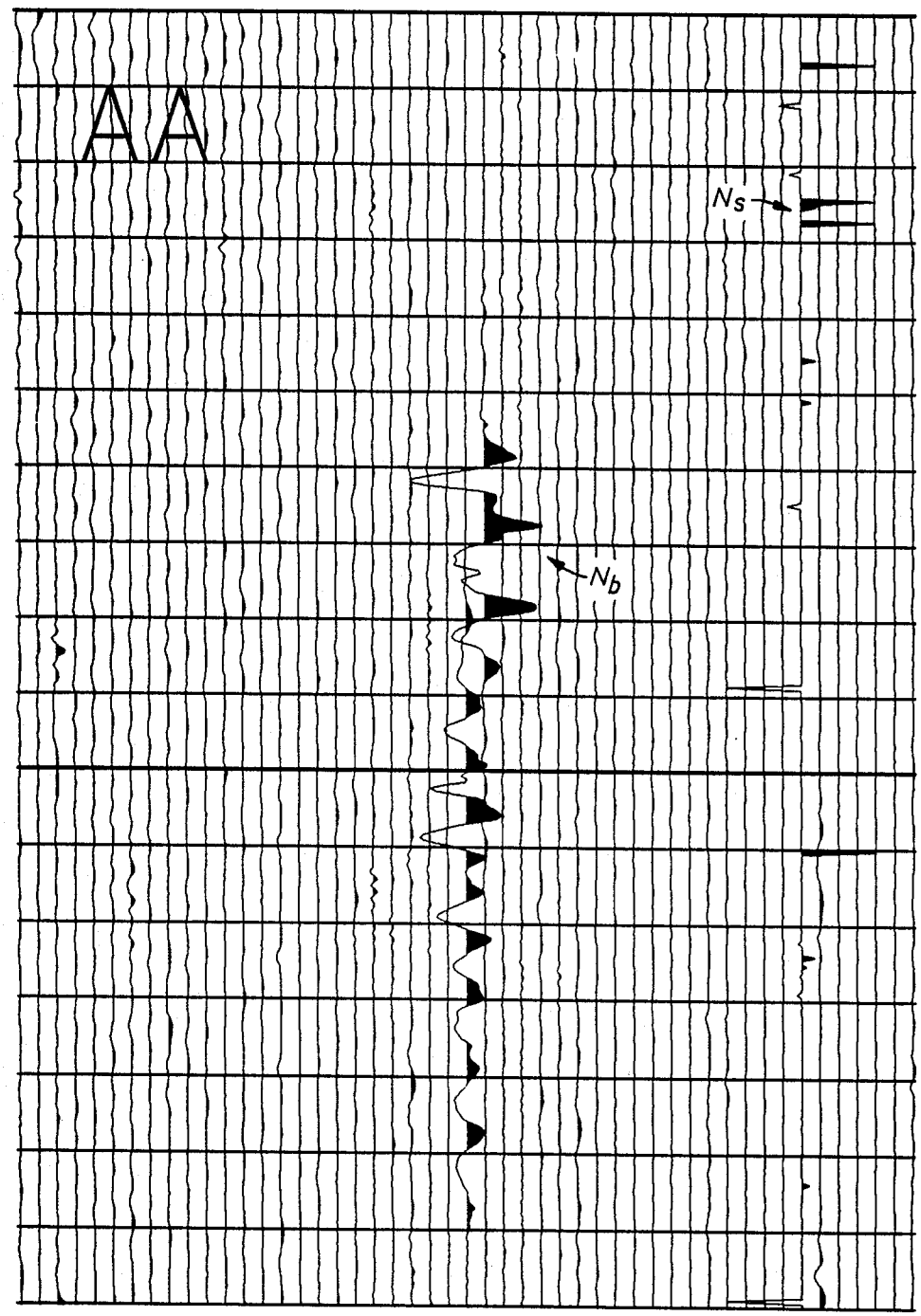
Figure 5:
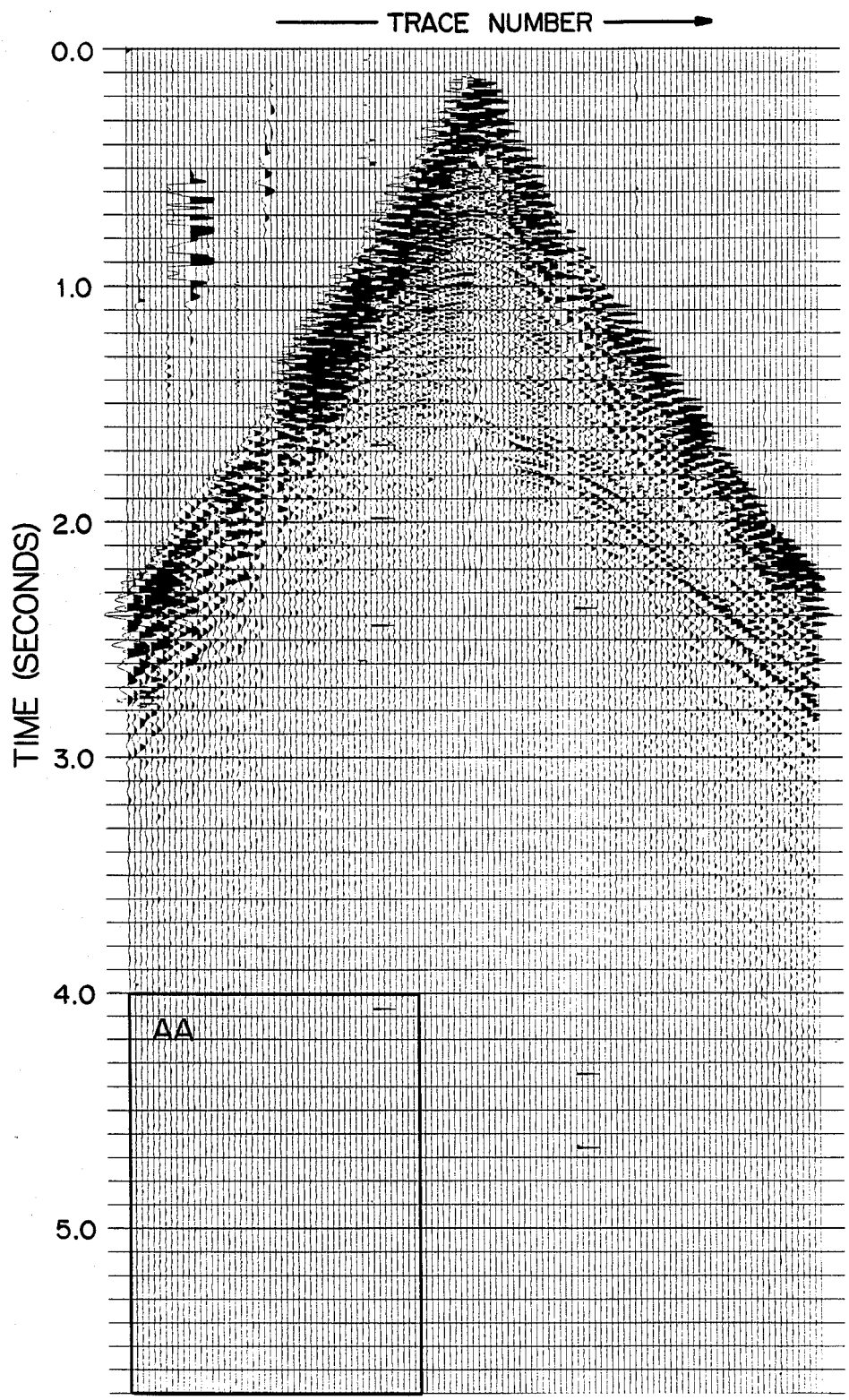

FIG. 3 generally illustrates one shot record taken from one survey shot associated with the above geometry of FIG. 2;

FIG. 4 is an enlarged portion of the shot record shown in FIG. 3 illustrating anomalous amplitudes often found in a shot record;

FIG. 5 is an example of the shot record shown in FIG. 3 after correction by the herein described method.

DETAILED DESCRIPTION OF A PREFERRED EMBODIMENT

Figure 1:
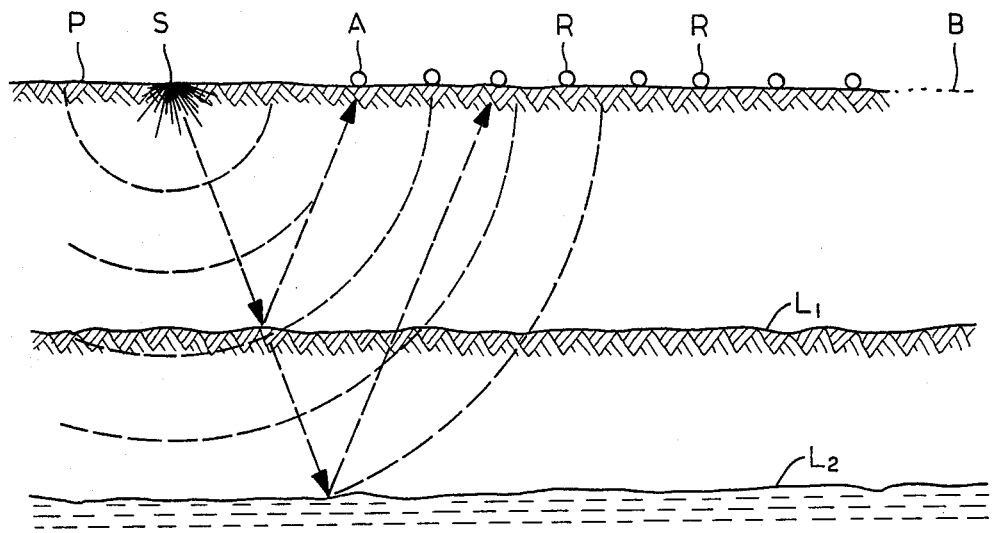
FIG. 1 is a general diagram of a conventional seismic reflection technique.

It is a primary objective of a geophysical survey to provide an accurate representation of the subsurface structures which may be present at a particular location on the earth. One of the tools used to obtain this representation is known as seismic reflection profiling. FIG. 1 is a general diagram of a conventional land seismic reflection technique which involves generating a seismic signal (S) at a "shot point" on the surface of the earth (P) by way of a vibratory or explosive source. The signal propagates downward as an expanding spherical wave front which is reflected by the subsurface layers (L) having variable acoustic impedance. The reflected seismic signal arriving at the surface is received at a plurality of points (R) on a line or grid along the surface of the earth. The signals received by the detectors (R) are converted to another signal which is recorded by a central recording device often located on a truck. Once all the data is collected for a given shot point, the acoustic signal generator is moved to a new shot point and the process is repeated.

FIG. 2 is a general illustration of one source-receiver geometry used in a seismic survey as described above. The Figure contains five receiver lines, otherwise known as "receiver spreads", labeled 1 through 5 which represent the lines of survey along a line A-B along the surface of the earth. Each receiver spread also contains a point shown by an "X" and labeled $S_1$, $S_2$, $S_3$, etc. which represent the shot point for each spread 1 through 5. For the sake of explanation, the spreads 1 through 5 are shown offset from each other and are just a sample of the many lines normally recorded in a typical survey. In reality, each seismic survey spread 1–5 would overlap the previous survey spread along the line A-B by a considerable distance.

The distance from the shot point (source) within a spread to a particular receiver is known as the offset distance. Each spread 1–5 also has a shot point common with the other spreads shot in a survey. That is the shot point occurs at the same location relative to the total number of receivers along a spread, thus the distance (offset) from the shot point to a particular receiver in each spread will be essentially the same. This type of survey also lends itself to common midpoint (CMP) or common depth point (CDP) collection of seismic data. Details of these terms will not be discussed herein and are well known to those skilled in the art.

It is generally held that to obtain an ideal representation of the subsurface, it would be preferred that the signals detected and recorded be unaffected by outside influences other than the structure which reflected the signal. Science has not yet been able to devise a way of receiving such pure data. The received data are subject to many outside influences which affect the quality of the data. The inventive technique described below provides one tool to better identify the role that one of these influences, noise, plays in the quality of seismic data.

Generally the quality of the seismic data depends on two broad categories of factors. The first factor is the equipment used in the survey. This includes everything from the type of source used to generate the signal, the kind of detectors used to receive the signal, and the recording equipment. The second factor which influences the quality of the seismic data is the subsurface geology of the earth. These elements include the type of material through which the signal propagates, the depth of the weathering layer along the surface, the density of the subsurface layers, the continuity of the subsurface layers, etc. The list is long. As mentioned briefly in the introduction above, the amplitude of the seismic signal has been of interest to geophysical scientists for some time. The amplitude of a received signal is a general indicator of the strength of the received signal as well as its phase relative to the signal generated. The alignment and consistency of the amplitude between adjacent traces in a seismic section helps the scientist determine the character of the reflecting horizon in the subsurface.

In evaluating anomalous noise amplitudes in the inventive method, data is brought in from the field complete with geometry information. Geometry information provides the location of the survey along the surface of the earth, as well as the location of each receiver or receiver group.

FIG. 3 generally illustrates one shot record taken from one shot point associated with the above geometry of FIG. 2. Each trace of a record is labeled at the top of the record according to its location along the line of survey, and its relative distance from the shot point is easily calculated. The vertical scale is in two-way travel time. The records taken from each line, such as those shown in FIG. 3 may contain up to as many as, or more than, 1024 different traces, each trace representing the signals received by a single detector or detector group at a known location on the surface of the earth. As shown in the Figure, most of the traces have relatively consistent amplitudes. A noticeable exception is marked in the box labeled AA showing a portion of the record containing a trace with an anomalous amplitude.

FIG. 4 is an enlarged portion of the shot record shown in FIG. 3 as box AA. In this Figure, the differences in the amplitudes from trace to trace are more clearly distinguishable than from FIG. 3. To eliminate these anomalous amplitudes we follow the herein described method.

In this method, each trace of a shot record is examined in a series of time windows shown generally as $t_1$, $t_2$, ... $t_n$ in FIG. 4. Each window may be of any desired period and is selected by the user. For the purposes of this discussion it will be assumed that the time window has a period of 200 milliseconds. Once a period is selected by the user, the window period remains constant during that operation/evaluation. The period may be changed for the next data set to be evaluated.

Once the window period and the traces to be evaluated have been determined, the method next calculates the amplitude values for each trace as a function of the window period. Rms (root mean square) values can be used to represent the amplitudes, as well as peak amplitudes values. It is preferred that rms values be used in situations where the noise in a section appears as long duration (20 to 300 milliseconds) anomalous amplitudes, often known as "blobs" in the industry. A blob is a noise artifact caused by some of the following factors: weeds or branches brushing against the geophones, traffic on nearby roads, as well as other extraneous events occurring during the recording process and appear as the amplitudes shown in FIG. 4 marked $N_b$. Peak amplitude values are preferred when attempting to discriminate against single sample (spike) noise in a section which may be caused by an error in the digital recording where one or more bits of a digital word are contaminated. A spike in FIG. 4 is labeled as $N_s$.

The assumptions that near-source and near-receiver amplitude effects are surface-consistent and that subsurface amplitude variations are subsurface-consistent lead to a mathematical model for the parameters that contribute to variations in observed amplitudes. Specifically, consider a trace at source i and receiver j, whose amplitudes are measured at different horizon windows h: an amplitude factor $A_{ijh}$ can be expressed as the product of surface consistent shot and receiver terms, subsurface-consistent geology (CDP) and offset terms, and channel number terms. According to the mathematical model, the actual variation of measured amplitudes $A_{ijh}$ is given by the expression:

$$A_{ijh} = S_i * R_j * G_{kh} * O_{lh} * C_c * N \qquad (1)$$

where $A_{ijh}$ is the measured amplitude level;

$S_i$ is the amplitude variation component associated with the source position i;

$R_j$ is the amplitude variation component associated with the detector position j;

$G_{kh}$ is the component of amplitude variation associated with the common depth point position k (also known as midpoint) in window h;

$O_{lh}$ is the amplitude variation component associated with offset l in window h;

$C_c$ is the component of amplitude variation associated with recording channel c; and N is the amount of noise.

Taking the logarithm of both sides of expression (1) yields an expression (2) of the following form:

$$\log A_{ijh} = \log S_i + \log R_j + \log G_{kh} + \log O_{lh} + \log C_c + \log N \quad (2)$$

Expression (2) is solved using an iterative method of matrix inversion such as the Gauss-Seidel method.

In this method, the number of terms in Expression (2) may be large. When working with such a large number of linear equations in seismic data processing, it is preferred that the solution be accurate and efficient. A number of solutions are in use, but we prefer to use the aforementioned Gauss-Seidel algebra matrix solution. This procedure is best described by referring to a line fitting example and solving for a and b in Expression (2.1):

$$\begin{bmatrix} 4 & 10 \\ 10 & 30 \end{bmatrix} \begin{bmatrix} a \\ b \end{bmatrix} = \begin{bmatrix} 13 \\ 35.4 \end{bmatrix} \quad (2.1)$$

When written as normal expressions one obtains, $$4a + 10b = 13 \quad (2.2)$$

and, $$10a + 30b = 35.4 \quad (2.3)$$

These expressions may be rearranged as $$a = 3.25 - 2.500b \quad (2.4)$$

and $$b = 1.18 - 0.333a. \quad (2.5)$$

Since the Gauss-Seidel matrix algebraic technique is iterative, starting values are needed. To start the iteration, set a=b=0. Substituting b=0 in Expression (2.4), one obtains a=3.25. Putting this solution into Expression (2.5) yields b=0.0977. At the end of the first iteration, a=3.25 and b=0.0977. For the second iteration, insert b=0.0977 into Expression (2.4) to obtain a=3.0075. Place a=3.0075 into Expression (2.5) to obtain b=0.1785. This iterative procedure is continued in Table 1.

The solution from the iterative procedure slowly converges toward the actual values, a=1.8, b=0.58. Convergence is not always guaranteed. Nevertheless, convergence can be attained with the Gauss-Seidel method described above, provided the unknowns are ordered properly; i.e., iteration starts with the correct unknown. The advantage of the Gauss-Seidel method is its ability to solve the large number of simultaneous equations rapidly.

TABLE 1

Gauss-Seidel iteration for solving Expression (2.1) for a and b (Values were rounded off for tabulation.) Actual Values: a = 1.8, b = 0.58

| Iteration | a | b |
|---|---|---|
| 1 | 3.25 | 0.0977 |
| 5 | 2.4918 | 0.3502 |
| 10 | 2.0712 | 0.4902 |
| 15 | 1.9031 | 0.5462 |
| 20 | 1.8358 | 0.5686 |
| 25 | 1.8090 | 0.5779 |
| 29 | 1.7997 | 0.5807 |

In applying the method to Equation (2), a basic assumption in the inversion is the variables from expression (1) initially have values of zero. The mean (clipped mean) amplitude attributable to the geology, or CDP position, is preferably solved first. Using this first amplitude value related to the geology, the same procedure is applied to obtain the amplitude value of the offset, followed by that for the channel. The procedure is repeated for each of the variables for all of the traces, with the exception of determining the value for the noise. The amplitude value for the noise drops out after all of the calculations since noise variables were not calculated using the Gauss-Seidel computation described above. The value for the noise variables will be addressed later on in the method.

Small inaccuracies of the average values for each variable are of little or no real concern. This step in the method is only concerned with the average amplitude of each signal relative to others in the record. Once values have been determined for each of the variables using the matrix inversion, they are recombined in the same form as expression (1) to yield a computed amplitude factor $B_{ijh}$ which is a measure of the noise free amplitude. Each trace window has two numerical values for the amplitude: a measured amplitude and an approximated noise-free amplitude. These two values are scaled in a window-by-window fashion as shown in expression (3):

$$X_{ijh} = \begin{cases} (B_{ijh}/A_{ijh})^n & \text{if } A_{ijh} \text{ is greater than } B_{ijh}; \\ \text{threshold} & \text{if } A_{ijh} \text{ is less than or equal to } B_{ijh} \end{cases} \quad (3)$$

where the superscript n is typically defined by the user (either 1 or 2). The value obtained from expression (3) provides a correction ratio which is an indication of whether or not to correct the trace for the anomalous noise amplitude or to delete the trace from the subsequent stacking sequence in the final data processing steps. The correction value is compared to a predetermined user' specified threshold value (usually 1.0) to determine whether anomalous noise amplitudes are present on the trace. The range of acceptable values may be chosen from analysis of histograms prior to conventional processing. FIG. 4 is an example of the seismic records after correction by the method described herein. Notice that marked trace of the data from line 2 n longer exhibits the wide swing in amplitude and is substantially similar to the other traces.

Although the invention has been described as a computer aided method of calculating, and correcting or suppressing anomalous noise amplitudes, it is entirely possible by one skilled in the art to implement this method in hardware so that the method may be conducted in the field as opposed to performing the method at a data processing center. The hardware for conducting this invention may be coupled ahead of the multiplexer and recorder in a seismic field data acquisition unit. The same device may be employed equally as well to seismic data taken from marine environments.

I claim:

1. A method for identifying anomalous noise amplitude data in a seismic section, comprising the steps of:
   (a) calculating a measured amplitude factor for each trace of the seismic section as a function of time;
   (b) computing a noise-free amplitude factor for each portion of a trace of the seismic section as a function of time;
   (c) calculating a correction ratio from the noise-free amplitude factor and the measured amplitude factor; and
   (d) comparing the correction ratio to a threshold value to determine whether an anomalous noise amplitude is present on a trace, and whether the anomalous amplitude may be corrected or the trace deleted prior to proceeding with conventional seismic data processing.

2. A method for identifying anomalous noise amplitude data in seismic records having a plurality of shot traces, comprising the steps of:
   (a) measuring an amplitude factor as a function of time for a predetermined number of the shot traces;
   (b) calculating a noise-free amplitude factor for the predetermined number of shot traces as a function of time;
   (c) comparing the noise-free amplitude factor and the measured amplitude factor to derive a correction ratio; and
   (d) comparing the correction ratio to a predetermined threshold value to determine whether an anomalous noise amplitude is present on a trace.

3. A method for identifying analogous noise amplitudes in seismic records by deriving a measured amplitude factor over predetermined periods of time for a predetermined number of traces comprising the records, computing a noise-free amplitude factor for the periods of time and number of traces, taking a ratio of the measured and noise-free amplitude factors to determine a correction factor which is compared to a predetermined threshold value for determining a presence of anomalous noise amplitudes in the seismic records, and suppressing or correcting traces experiencing anomalous noise amplitudes.

4. The method of claim 1, further comprising the step of correcting the traces experiencing anomalous noise amplitudes prior to conventional seismic data processing based on the calculated correction ratio.

5. The method of claim 1, further comprising the step of suppressing the traces experiencing anomalous noise amplitudes prior to conventional seismic data processing based on the calculated correction ratio.

6. The method of claim 1, wherein the step of calculating a measured amplitude factor for each trace of the seismic section as a function of time uses the following expression:

$$A_{ijh} = S_i{}^* R_j{}^* G_{kh}{}^* O_{lh}{}^* C_c{}^* N$$

where
   $A_{ijh}$ is the measured amplitude level;
   $S_i$ is the amplitude variation component associated with the source position i;
   $R_j$ is the amplitude variation component associated with the detector position j;
   $G_{kh}$ is the component of amplitude variation associated with the common depth point position k (also known as midpoint) in window h;
   $O_{lh}$ is the amplitude variation component associated with offset l in window h;
   $C_c$ is the component of amplitude variation associated with recording channel c; and
   N is the amount of noise.

7. The method of claim 1, wherein the step of computing a noise-free amplitude factor further comprises the step of iteratively calculating a matrix inversion according to the expression:

$$\log A_{ijh} = \log S_i + \log R_j + \log G_{kh} +$$
$$\log O_{lh} + \log C_c + \log N.$$

8. The method of claim 7, wherein the step of calculating a matrix inversion may be accomplished using a Gauss-Seidel method of calculating a matrix inversion.

9. The method of claim 1, wherein the step of calculating a correction ratio may be accomplished according to the following expression:

$$X_n = \begin{cases} (B_{ijh}/A_{ijh})^n & \text{if } A_{ijh} \text{ is greater than } B_{ijh}; \\ \text{threshold} & \text{if } A_{ijh} \text{ is less than or equal to } B_{ijh} \end{cases}$$

where superscript n and the threshold are user defined.

10. The method of claim 2, further comprising the step of correcting the traces experiencing anomalous noise amplitudes prior to conventional seismic data processing according to a comparison of the calculated correction ratio to the predetermined threshold value.

11. The method of claim 2, further comprising the step of suppressing the traces experiencing anomalous noise amplitudes prior to conventional seismic data processing according to a comparison of the calculated correction ratio to the predetermined threshold value.

12. The method of claim 2, wherein the step of measuring an amplitude factor as a function of time for a predetermined shot trace uses the following expression:

$$A_{ijh} = S_i{}^* R_j{}^* G_{kh}{}^* O_{lh}{}^* C_c{}^* N$$

where
   $A_{ijh}$ is the measured amplitude;
   $S_i$ is an amplitude variation component associated with a source position i;
   $R_j$ is an amplitude variation component associated with a detector position j;
   $G_{kh}$ is a component of amplitude variation associated with a common depth point position k (also known as midpoint) in window h;
   $O_{lh}$ is an amplitude variation component associated with offset l in window h;
   $C_c$ is a component of amplitude variation associated with recording channel c; and
   N is an amount of noise.

13. The method of claim 2, wherein the step of calculating a noise-free amplitude factor further comprises the step of iteratively calculating a matrix inversion according to the expression:

$$\log A_{ijh} = \log S_i + \log R_j + \log G_{kh} +$$

$$\log O_{lh} + \log C_c + \log N.$$

14. The method of claim 13, wherein the step of calculating a matrix inversion may be accomplished using a Gauss-Seidel method of calculating a matrix inversion.

15. The method of claim 2, wherein the step of comparing the noise-free amplitude factor and the measured amplitude factor to derive a correction ratio may be accomplished according to the following expression:

$$X_n = \begin{array}{l} (B_{ijh}/A_{ijh})^n \text{ if } A_{ijh} \text{ is greater than } B_{ijh}; \\ \text{threshold if } A_{ijh} \text{ is less than or equal to } B_{ijh} \end{array}$$

where superscript n and the threshold are user defined.

* * * * *

UNITED STATES PATENT AND TRADEMARK OFFICE
CERTIFICATE OF CORRECTION

PATENT NO. : 4,866,679
DATED : SEPTEMBER 12, 1989
INVENTOR(S) : RONALD E. CHAMBERS

It is certified that error appears in the above-identified patent and that said Letters Patent is hereby corrected as shown below:

Col. 6, line 58, delete reference numeral "4" and insert therefor reference numeral --5--.

Signed and Sealed this

Thirteenth Day of April, 1993

Attest:

STEPHEN G. KUNIN

*Attesting Officer*   *Acting Commissioner of Patents and Trademarks*